United States Patent [19]

Dagiantis

[11] Patent Number: 4,960,154
[45] Date of Patent: Oct. 2, 1990

[54] SANITARY WATER VALVE

[75] Inventor: Christos Dagiantis, Anthens, Greece

[73] Assignee: American Standard Inc., New York, N.Y.

[21] Appl. No.: 246,342

[22] Filed: Sep. 19, 1988

[30] Foreign Application Priority Data

Sep. 24, 1987 [AT] Austria .................. 2428/87

[51] Int. Cl.⁵ ........................................... F16K 11/078
[52] U.S. Cl. ........................... 137/625.17; 137/625.4;
                                          137/597; 251/297
[58] Field of Search .............. 137/625.17, 597, 625.4;
                                          251/297

[56] References Cited

U.S. PATENT DOCUMENTS

| | | | |
|---|---|---|---|
| 1,615,730 | 1/1927 | Vallier | 137/597 X |
| 2,860,661 | 11/1958 | Boegel | 137/597 X |
| 3,232,308 | 2/1966 | Moen | 137/597 X |
| 3,372,710 | 3/1968 | Miller | 137/597 X |
| 3,823,742 | 7/1974 | Von Corpon | 137/597 X |
| 4,653,538 | 3/1987 | Tsutsui et al. | 137/597 X |
| 4,681,140 | 7/1987 | Hayman | 137/597 |
| 4,706,709 | 11/1987 | Monch | 137/597 |

Primary Examiner—John Rivell
Attorney, Agent, or Firm—Blum Kaplan

[57] ABSTRACT

A sanitary water valve having valve disks lying parallel to each other in a housing. One of the valve disks is fixed against rotation and has water inlets and at least one water outlet. Another disk is movable relative to the rotationally fixed valve disk and includes a surface channel for water diversion purposes. The movable valve disk is provided with the surface channel and selectively connects the water inlets to water tap stations and includes a sealing surface for closing off the water inlets.

12 Claims, 8 Drawing Sheets

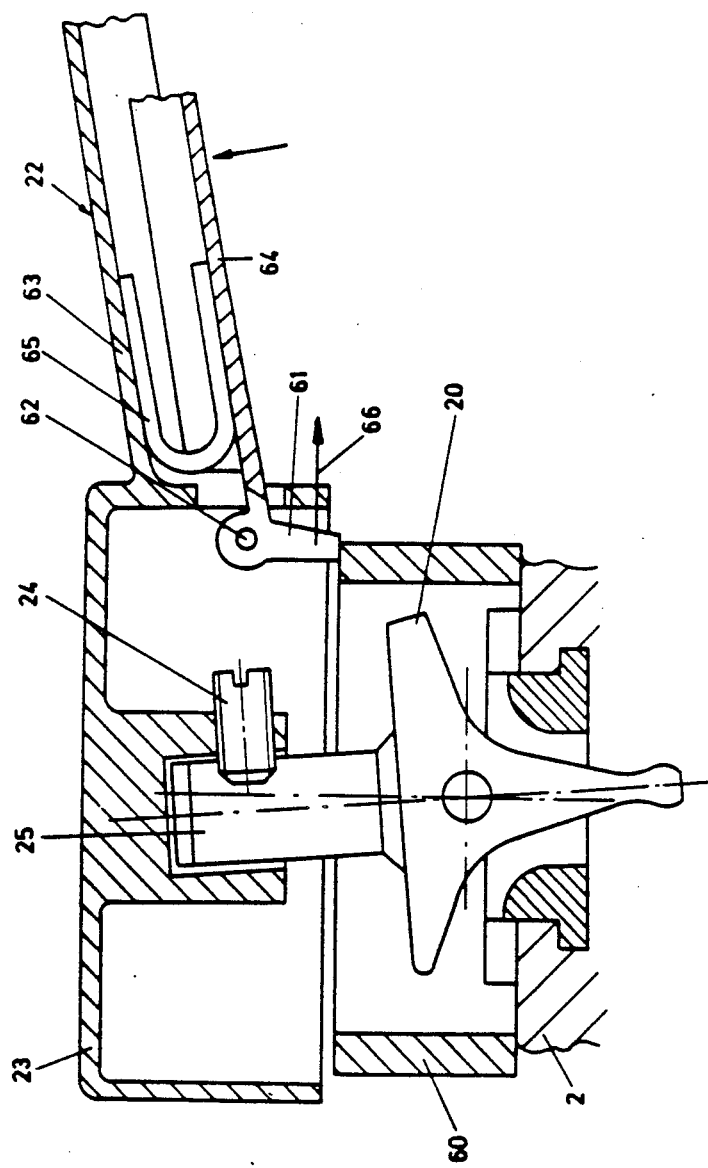

SANITARY WATER VALVE

FIELD OF THE INVENTION

The present invention relates to a sanitary water valve having valve disks lying parallel to each other in a housing, where one of the disks is fixed against rotation and has water inlets and at least one water outlet, and where another of the disks is movable relative to the one fixed against rotation and includes a surface channel for diversion of water purposes.

BACKGROUND OF INVENTION

In many cases, there is a need to mix cold and hot water and then supply the mixture to one or more taps using a water diversion means.

In general, it is customary to provide the water diversion devices between the taps outside of the sanitary water valve itself. Examples of prior art water diversion devices include the use of a lever that closes one supply line and opens another at a branch, or alternatively, a pull knob or the like.

Such prior art detached water diversion devices have been employed for single-lever mixers including for example, those single lever mixers in which ceramic disks are arranged displaceable one upon another. Notably, such prior art diversion devices have been provided on outside of the sanitary water valve proper. However, water diversions have not yet been successfully integrated into the sanitary water valve proper, nor has there been any suggestion in the prior art, how to do so.

Thus, there is a great need in the sanitary water valve arts, for a sanitary water valve having a single-lever mixer, and in which a water diversion facility is wholly integrated into the sanitary water valve proper.

Accordingly, it is a primary object of the present invention to provide an improved sanitary water valve having a single lever mixer and a water diversion which is fully integrated into the water valve proper.

It is a further object of the present invention to provide a sanitary water valve having ceramic disks, and enabling the water diversion between a plurality of water taps to be effected by actuation of the lever, as well as the adjustment of the ratio of mixture between hot and cold water.

SUMMARY OF THE PRESENT INVENTION

According to the present invention a sanitary water valve is provided for diverting the flow of water to water tap stations. The sanitary water valve comprises a housing having water tap stations and first and second valve disks lying parallel to each other in the housing. The first valve disk is fixed against rotation and has water inlets and at least one water outlet. The second valve disk is movable relative to the first valve disk and has a surface channel for water diversion purposes and a sealing surface for closing off the water inlets. A moving means is provided for moving the second valve disk with respect to the first valve disk so as to selectively connect the water inlets to the tap water stations by way of the surface channel. In the one embodiment, the sanitary water valve comprises a third valve disk and the moving means is an actuating lever. The third valve disk is fixed with respect to the first valve disk and has a bottom surface and an opening through which passes the actuating lever. The top surface of the bottom valve disk is displaceable in contact with the bottom surface of the third disk and is displaceable with respect to the third disk in response to movement of the actuating lever. A mixing chamber is formed by the boundaries created by the exposed top surface of the first valve disk. The exposed bottom surface of the third disk and the lateral surface of the second valve disk. Notably, it is within the mixing chamber where hot and cold water mixes and is later diverted to one of the water tap stations.

As a result of the present invention, a sanitary water valve has been provided in which cold and hot water are mixed in one cartridge, and may be supplied to a plurality of taps depending on the setting of the lever. By way of the present invention, it is now possible to eliminate the additional water diversion, for example, between tub and shower, wash stand and sprinkler, bidet and whirlpool, wash stand and oral appliance, etc. The sanitary water valve of the present invention might also be conceived as a four-way valve.

BRIEF DESCRIPTION OF THE DRAWINGS

The invention is represented in more detail in the drawings by way of example, wherein:

FIG. 13 shows another possible mode of fixing the operating lever;

DETAILED DESCRIPTION OF PREFERRED EMBODIMENT

Figure 1:
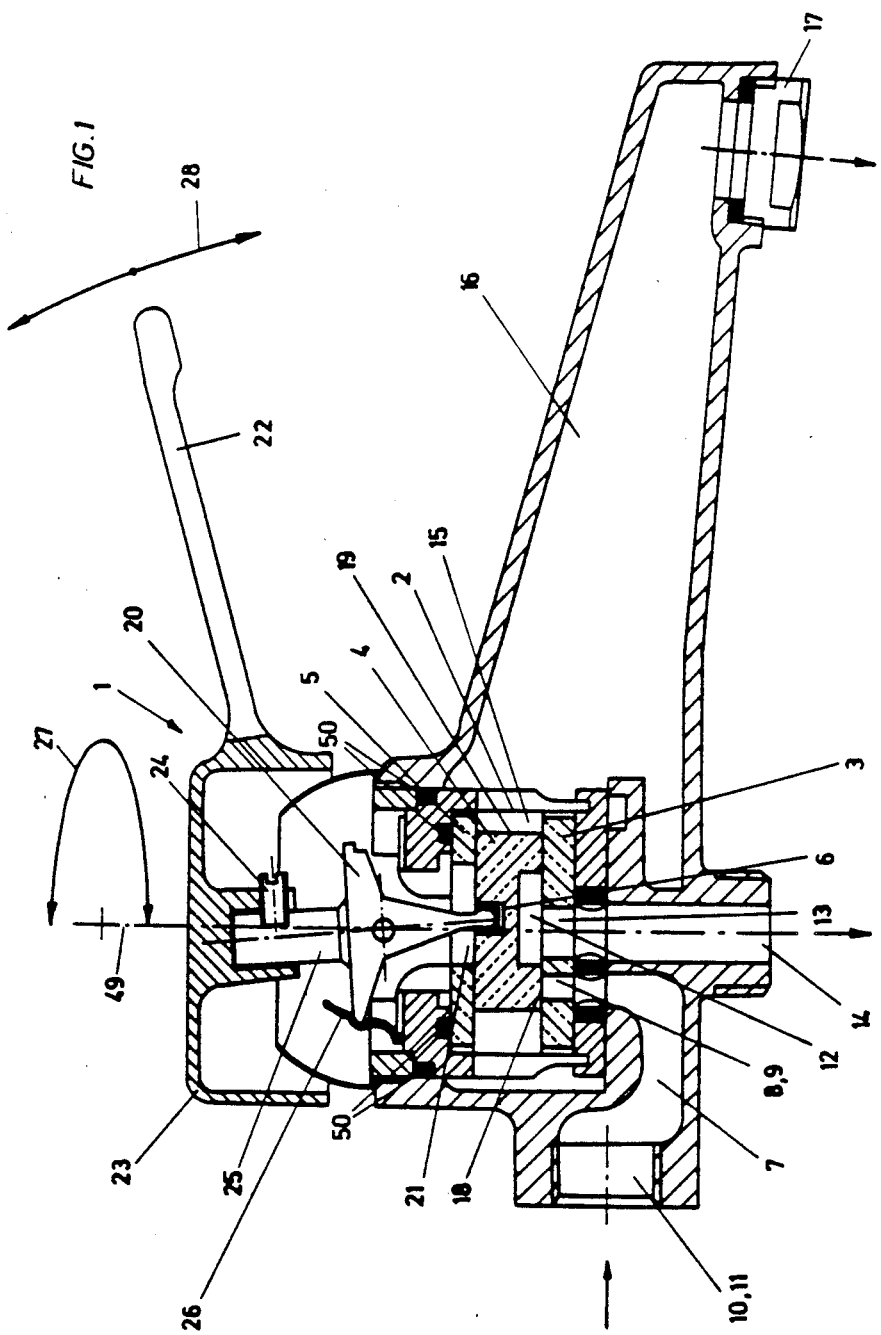
FIG. 1 shows a sanitary water valve arranged according to the present invention.

Referring to FIG. 1, it is seen that the sanitary water valve 1 of the present invention has a cartridge-like housing 2 in which a plurality of valve disks 3, 4, 5 are arranged in series. The first valve disk 3 is fixed against rotation and provided with water inlets 8, 9. These inlets 8, 9 are connected by way of a passage 7 to a supply 10, 11 for cold and hot water respectively. On this first, rotationally fixed valve disk 3, a second valve disk 4 is movably arranged and has a surface channel 12 capable of connecting the inlets 8, 9 of the first valve disk 3, to an outlet 13 which may lead by way of a connection 14, to a water tap station, for example a shower. On its upper face, this second, movable valve disk 4 bears a recess 6 in which the end of a lever 20 engages. Additionally, the top face of this movable valve disk 4 slides on another rotationally fixed disk 5 having an opening 21 for passage of the lever 20. The lever 20 bears a projection 25 fixedly connected by way of a set screw 24 to a cap 23. To move the cap 23, a handle 22 is provided. The cap is capable of being moved in the direction of arrow 27 or arrow 28, and together with the cap, the lever 20 is capable of movement as well. This lever 20 is at a slight angle to the vertical.

As illustrated in FIG. 1, the movable disk 4 of valve 1 is in a position in which the inflow of water by way of the inlets 8, 9 is prevented by the sealing surface 18. When the handle 22 is moved upward in the direction of the arrow 28, the valve disk 4 is displaced to the right in FIG. 1 and the inlets 8 and 9 open into a mixer chamber 15 connected to the outlet 16. In a conventional manner, the outlet 16 has at its termination, a bubbler 17 and may serve as a tub filling fixture. The mixer chamber 15 is formed by the lateral surface 19, the bottom surface of the top disk 5 and the top surface of the bottom disk 3.

If the handle 22 is moved downward in the direction of the arrow 28, then the valve disk 4 is displaced to the left in FIG. 1, thereby connecting to the outlet 13 by way of the surface channel 15, serving as diversion chamber, and hence the water flows to a different tap station, for example to a shower. To regulate the mixture ratio of the water, i.e., its temperature, handle 22 with cap 23 is rotated about the axis 49.

One end of the lever 20 is held by a releasable fixation 26 that holds the lever 20 in its mid-position, i.e., in the closed position of the sanitary water valve. The seals 50 ensure that water can be drawn off only by way of the outlet 16 or the connection 14 as the case may be.

Figure 2:
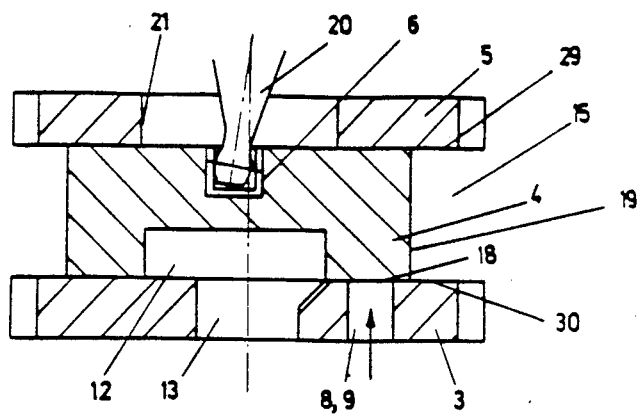
FIGS. 2, 3 and 4 show various positions of a movable valve disk, and hence the supply of water to various taps.
Figure 3:
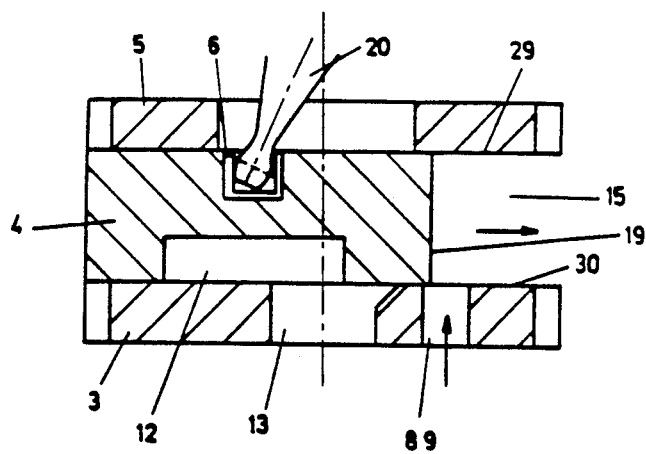
Figure 4:
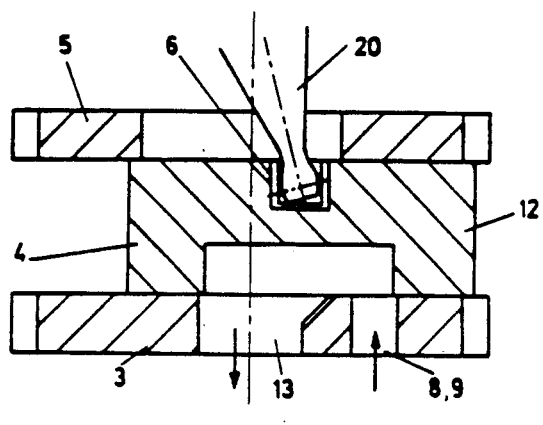

Referring to FIGS. 2, 3 and 4, there are shown various settings of the movable valve disk 4 relative to the two stationary valve disks 3 and 5 of FIG. 1. FIG. 2 also illustrates the closed position of the valve, i.e., when the inlets 8, 9 are closed by the sealing surface 18 on the valve disk 4, in which case water can enter neither the diversion channel 12 nor the mixer chamber 15. The lever 20 for moving the movable valve disk 4 passes through the opening 21 in the top valve disk 5 and is engaged in the recess 6.

As shown in FIG. 3, if the valve disk 4 is moved to the left, then hot and cold water can enter through the inlets 8, 9 into the mixer chamber 15, bounded by the lateral surface 19 of the movable valve disk 4, the top surface 30 of the bottom stationary valve disk 3, and the bottom surface 29 of the top stationary valve disk 5. Out of this mixer chamber 15, the mixture of hot and/or cold water then flows to a water tap station.

In FIG. 4, the movable valve disk 4 is shown moved to the right, and as such, the inlets 8, 9 are connected to the outlet 13 by way of the diversion channel 12. From the outlet 13, the water then flows to another tap station.

Figure 5:
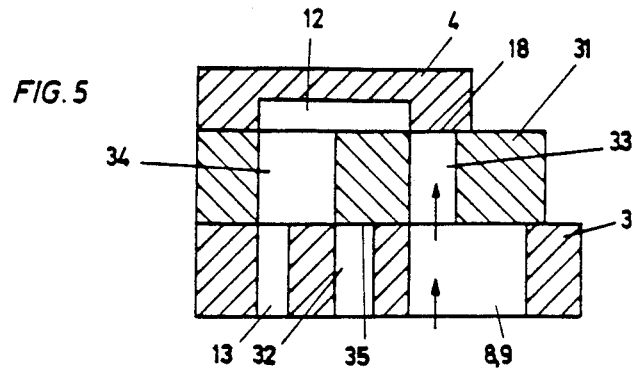
FIGS. 5, 6 and 7 show another embodiment of the invention by way of example.
Figure 6:
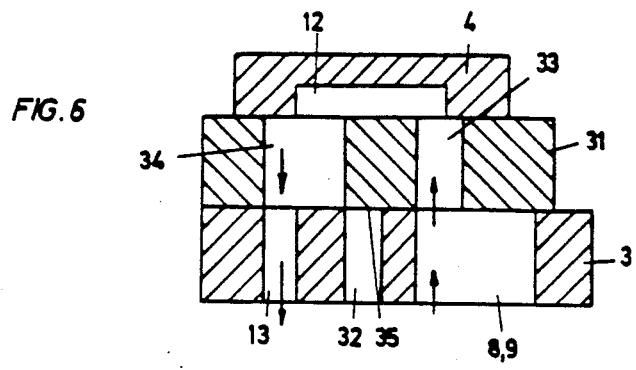
Figure 7:
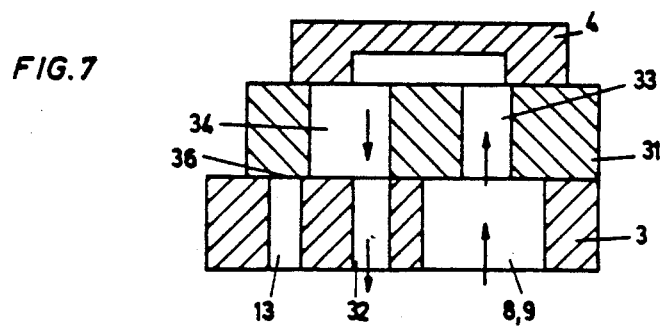

Referring now to FIGS. 5, 6 and 7, another embodiment of the present invention is shown. Therein, in addition to the outlet 13, the bottom stationary valve disk 3 has another outlet 32. Between the stationary valve disk 3 and the movable valve disk 4 for using the diversion channel 12, there is still another movable valve disk 31. The valve disk 31 has a slot-like opening 3 for the incoming water and slot-like opening 34 for the outgoing water.

FIG. 5 illustrates the closed position of the sanitary water valve. Therein, the sealing surface 18 of the movable valve disk 4 closes off the water inlet 33 formed in the middle valve disk 31, and as a result, no water can reach the outlets 13 and 32.

In FIG. 6, the top movable valve disk 4 is displaced to the right, and the incoming water can flow into the diversion channel 12 by wa of inlet 33 in the middle valve disk 31. By way of outlet 34, the incoming water through diversion channel 12 can reach either outlet 13 or outlet 32 in the stationary disk 3. In FIG. 6, the sealing surface 35 of the middle valve disk 31 is shown closing off the outlet 32, and the water is forced to drain through outlet 13.

In FIG. 7, another valve setting is shown. There, the sealing surface 36 of the middle disk 31 shuts off the outlet 13, and the water must drain by way of outlet 32. To each of the outlets 13 and 32, a water tap station is connected, such as a tub filling fixture and a shower.

Figure 8:
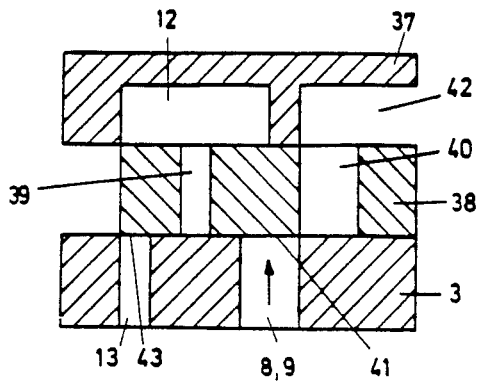
FIGS. 8, 9 and 10 show still another embodiment of the invention by way of example.
Figure 9:
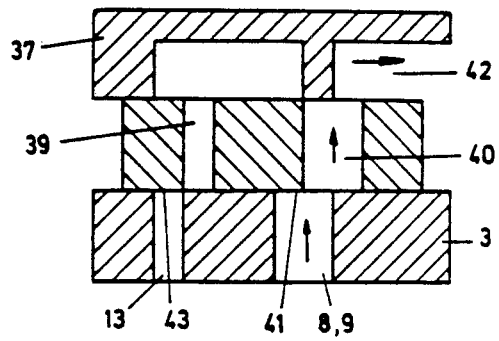
Figure 10:
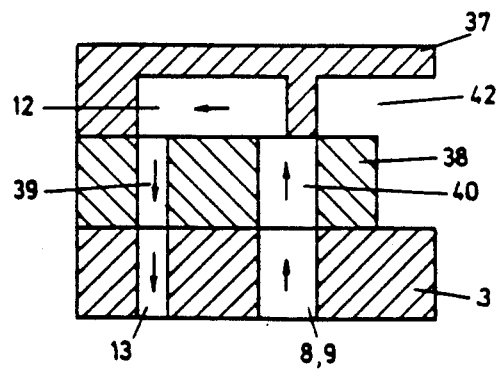

Referring now to FIGS. 8, 9 and 10, another embodiment of the present invention is represented. In this embodiment, the sanitary water valve includes a movable valve disk 38 with water inlets 40 and outlets 39 upon the stationary valve disk 3. On this movable disk 28 rests a stationary disk 37 which again forms a water diversion channel 12.

FIG. 8 illustrates the closed position of the sanitary water valve of the present invention. There, the sealing surface 41 of the movable valve disk 38 prevents entry of water through inlets 8 and 9.

In FIG. 9, the movable valve disk 38 has been displaced somewhat to the left, connecting the inlets 8 and 9 in the fixed valve disk 3, to a mixer chamber 42 in the top most valve disk 37, by way of the water inlet 40 in the movable valve disk 38. This mixer chamber 42 is then connected to a water tap station. If the valve disk 38 is displaced still farther to the left, as illustrated in FIG. 10, then the water inlet 40 is placed in communication with the water diversion channel 12, but the outlet to the mixer chamber 42 is blocked. Thus, the water must now flow by way of this diversion channel 12, further by way of the water outlet 39, and then through outlet 13 on to the second water tap station.

Figure 11:
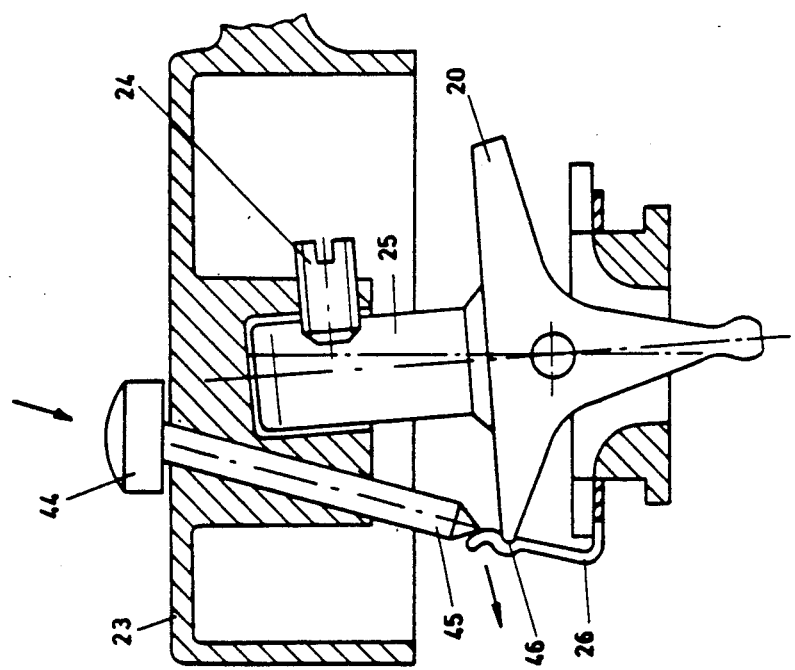

As previously illustrated in FIG. 1, a fixation 26 is provided for the lever 20. Its purpose is twofold: firstly to hold the sanitary water valve in its closed position, and secondly to indicate to the operator when the valve has been switched from one tap station to the other. In FIG. 11, a spring 26 is provided, having a notch 46 to engage one end of the lever 20. In contact with the spring 26, there is a pin 45 which in this case passes through the cap 23 and has a head 44 at its upper end. By pressing this head 44, the notch 46 is released from the lever 20, so that then the cap 23 and with it, by way of the connection of the set screw 24 to the projection 25, the lever 20 are released without difficulty.

Figure 12:
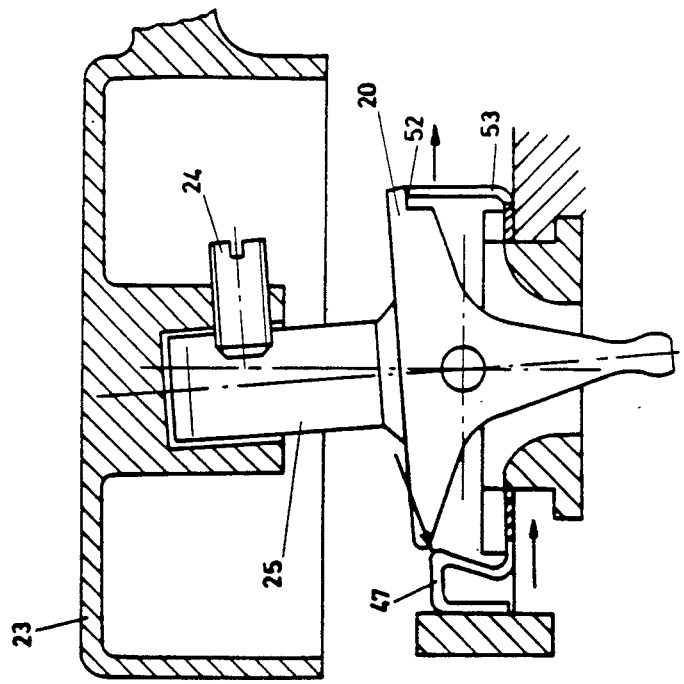
FIGS. 11 and 12 show possible modes of fixing the mid-position of an actuating lever.

Another possible mode of fixation is shown in FIG. 12. As shown therein, one end of the lever 20 is provided with a step 52, and in the mid-position the step 52 rests on a support 53 and the other end of the lever 20 is in contact with a spring 47. The support 53 and the spring 47 are fixedly connected to each other or in one piece. Notably however, this unit of support and spring are displaceable by an amount required to release the step 52 of the lever 20. If the lever 20 is tilted, the spring 47 is compressed by the lever 20, and hence the support 53 is brought under the step 52 of lever 20. By the clamping action exerted by the closing operation on the spring and support unit, the latter remains in the contact position and prevents a switch to another tap station. After the handle is released, the fixation by the spring 47 is moved back and unlocked, and the operator is therefore able at will to open the one tap station or the other.

FIG. 13 represents another possible mode of fixing the operating lever. For the protection of lever 20, a sleeve 60 is provided between the cap 23 with handle 22 and the top of the cartridge-like housing 2. Sleeve 60 is employed to support a lever 61 pivoted on a shaft 62 in the cap 23. The handle 22 for moving the cap 23 includes a top part 63 rigidly connected to the cap 23 and a bottom part 64 connected to the lever 61 and movable relative to the top part 63 of the handle 22. Between the top part 63 and the bottom part 64 of the handle, there is a spring 65 holding these two handle parts 63 and 64 at a preassigned distance. With this assembly it is possible, by pressing the two handle parts 63 and 64 together, to swing the lever 61 away in the direction of the arrow 66 and thus release the fixation.

Figure 14:
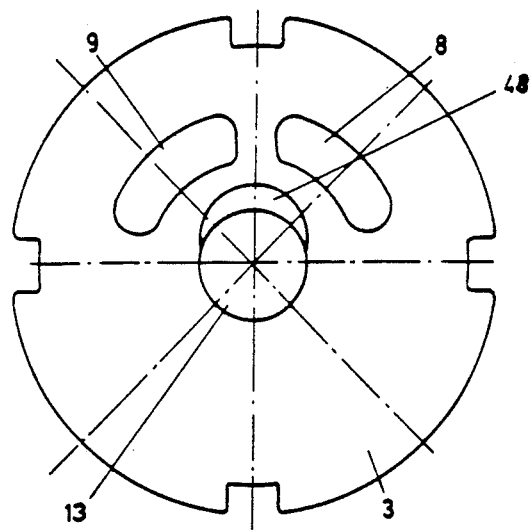
FIG. 14 shows a bottom view of the stationary valve disk.

Referring to FIG. 14, a top view of the stationary valve disk 3 is shown, as employed in FIG. 1. The disk has an arcuate inlet 8 for cold water and an arched inlet 9 for hot water. Here there is an outlet 13 which, as maybe seen from FIGS. 2, 3 and 4, is flanged on, preferably at an angle of 45°.

Figure 15:
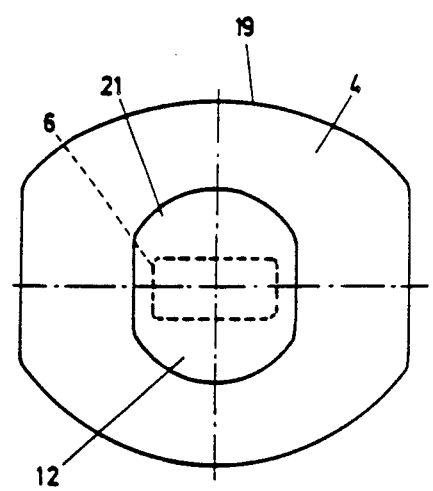
FIG. 15 shows a bottom view of a displaceable valve disk.

In FIG. 15, there is shown a bottom view of the movable valve disk 4 having a water diversion channel 12 and bounding surface 19 for the mixer chamber 15, which leads on to the other water tap station.

Figure 16:
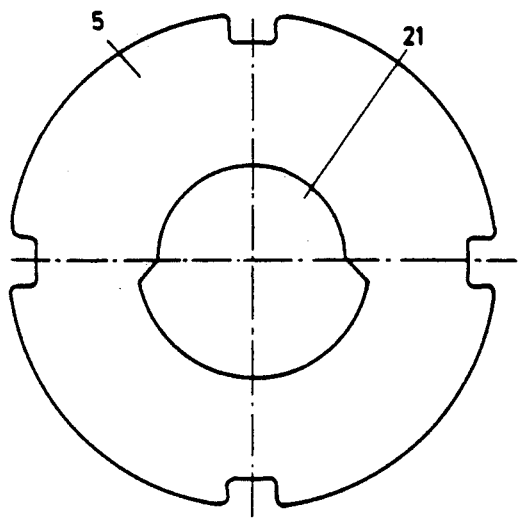
FIG. 16 shows a bottom view of another stationary ceramic valve disk.

In FIG. 16, a bottom view of the top stationary valve disk 5 of FIG. 1, is shown therein, the passage openings 21 for the lever 20 are formed by two semicircular openings of unlike diameters, with the ends of the two semicircles being joined by a bevel.

Figure 17:
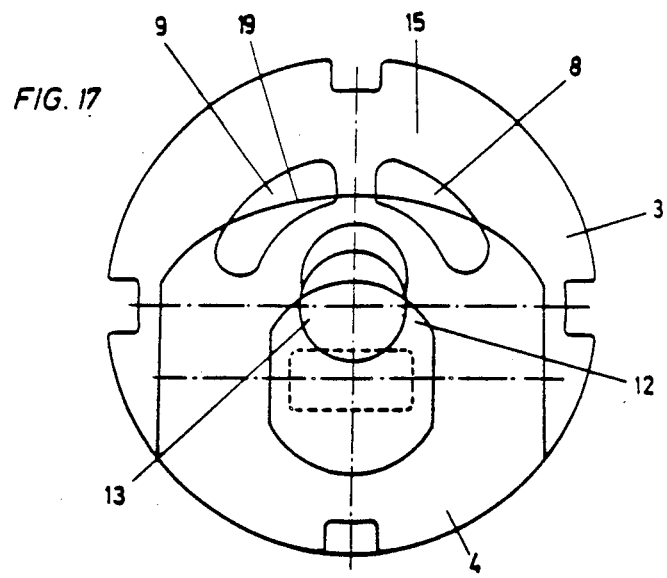
FIG. 17 shows the relative positions of two ceramic valve disks in a diversion setting of the sanitary water valve.

FIG. 17 shows the position of the two valve disks 3 and 4 as seen from below, where mixed water is being carried to a tap station, for example to fill a bathtub. As illustrated in FIG. 17, the lateral surface 19 of the movable disk 4 lies over the water inlets 8 and 9, and hence the water can enter the chamber 15 ahead of this lateral surface. The hot and/or cold water is mixed in the chamber 15 and then flows to the tap station. Since the water diversion channel 12 does not lie over the water inlets 8 and 9, water cannot reach the outlet 13.

Figure 18:
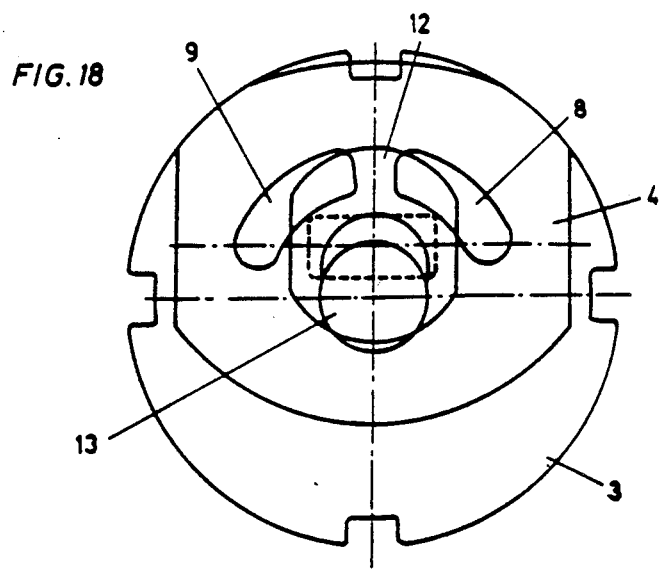
FIG. 18 shows the relative position of the valve disks in another diversion setting of the sanitary water valve.

In FIG. 18, the other position is shown. Therein, the diversion channel 12 connects the water inlets 8 and 9 to the outlet 13, and water cannot reach the mixer chamber 15 or the other tap station.

The operation of a sanitary water valve according to FIG. 1 is very simple. By raising the handle 22 and hence the lever 20 out of the mid-position, the tub inlet is opened. By rotating the handle 22, the mixed temperature of the mixed water is regulated. By pressing the lever 20 out of mid-position, the water is directed to the shower and the mixed temperature is regulated by rotating the handle 22 likewise. By means of the fixation system 26, the mid-position of the lever 20 is secured, and an unintentional opening, for example, of the shower when shutting off the tub inlet, is avoided.

While the particular enbodiments shown and described above have proven to be useful in many applications involving the sanitary water valve arts, further modifications herein dislosed will occur to persons skilled in the art to which the present invention pertains and also such modifications are deemed to be within the scope and spirit of the present invention defined by the appended claims.

What is claimed is:

1. A sanitary water valve for diverting the flow of water to tap stations, said sanitary water valve comprising:
    a housing having water tap stations;
    first, second and third valve disks lying parallel to each other in said housing,
    said first valve disk having a top surface and being fixed against rotation with water inlets and at least one water outlet, said second valve disk being movable relative to said first valve disk and having a lateral surface channel for water diversion purposes and a sealing surface for closing off said water inlets,
    said lateral surface channel of the second valve disk and said top surface of the first valve disk forming the boundaries of a mixing chamber for one of said tap stations,
    an actuating lever for moving said second valve disk with respect to said first valve disk so as to selectively connect said water inlets to said water tap stations by way of said surface channel,
    said third valve disk is fixed with respect to said first valve disk and has a bottom surface and an opening through which passes said actuating lever, a top surface of said second valve disk being displaceably in contact with said bottom surface of said third disk and being displaceable with respect to said third disk in response to movement of said actuating lever.

2. A sanitary water valve according to claim 1, which further comprises a fixation for fixing the selected position of said actuating lever.

3. The sanitary water valve according to claim 1, wherein said opening in said third valve disk has a first semicircular contour joined by way of bevels to a second semicircular contour having a radius greater than said first semicircular contour.

4. A sanitary water valve for diverting the flow of water to water tap stations, said sanitary water valve comprising:
    a housing having water tap stations;
    first, second and intermediate valve disks lying parallel to each other in said housing, said first valve disk being fixed against rotation and having several water inlets each communicating with one of said water tap stations and at least one water inlet, said intermediate valve disk having several water passages and resting displaceably on the said first valve disk, said intermediate valve disk further having sealing surfaces to close off said water outlets in said first valve disk, said second valve disk being movable relative to said intermediate valve disk and having a surface channel for water diversion purposes and a sealing surface to close off at least one of said water passages in said intermediate valve disk; and
    moving means for moving said intermediate valve disk relative to said first valve disk and said intermediate valve disk relative to said second valve disk, so as to selectively connect said water inlet to said water tap stations by way of said water passages in said intermediate valve disk and said surface channel in said second valve disk.

5. A sanitary water valve according to claim 4, which further comprises a fixation for fixing the selected position of said moving means.

6. The sanitary water valve of claim 5, wherein said fixation is provided with a spring having a notch engaged by a flange on said moving means.

7. The sanitary water valve of claim 6, which further comprises a pin capable of pressing said spring out of said fixed selected position when said pin is depressed.

8. A sanitary water valve for diverting the flow of water to tap stations, said sanitary valve comprising:
   a housing having two water tap stations;
   a first valve disk in said housing being fixed against rotation and having water inlets and at least one water outlet;
   an intermediate valve disk being displaceably arranged on said first valve disk, said intermediate valve disk having a sealing surface for closing off said water inlets in said first valve disk;
   a second valve disk being stationary with respect to said first valve disk and having a surface channel for diversion of water purposes, said first, intermediate and second valve disks lying parallel to each other in said housing; and
   moving means for moving said intermediate valve disk with respect to said first and second valve disks so as to selectively connect said water inlets to said water tap stations by way of said surface channel.

9. A sanitary water valve according to claim 8, which further comprises a fixation for fixing the selected position of said moving means.

10. The sanitary water valve of claim 9, wherein said fixation is provided with a spring having a notch engaged by a flange on said moving means.

11. A sanitary water valve for diverting the flow of water to water tap stations, said sanitary water valve comprising:
    a housing having water tap stations;
    first and second valve disks lying parallel to each other in said housing,
    said first valve disk being fixed against rotation and having water inlets on at least one water outlet, said second valve disk being movable relative to said first valve disk and having a surface channel for water diversion purposes and a sealing surface for closing off said water inlets;
    moving means for moving said second valve disk with respect to said first valve disk so as to selectively connect said water inlets to said water tap stations by way of said surface channel; and
    a fixation device for fixing the selected position of said moving means wherein said fixation is provided with a spring having a notch engaged by a flange on said moving means.

12. The sanitary water valve of claim 11, which further comprises a pin capable of pressing said spring out of said fixed selected position when said pin is depressed.

* * * * *